J. W. PACKARD.
SHOE.
No. 11,362. Reissued Aug. 22, 1893.
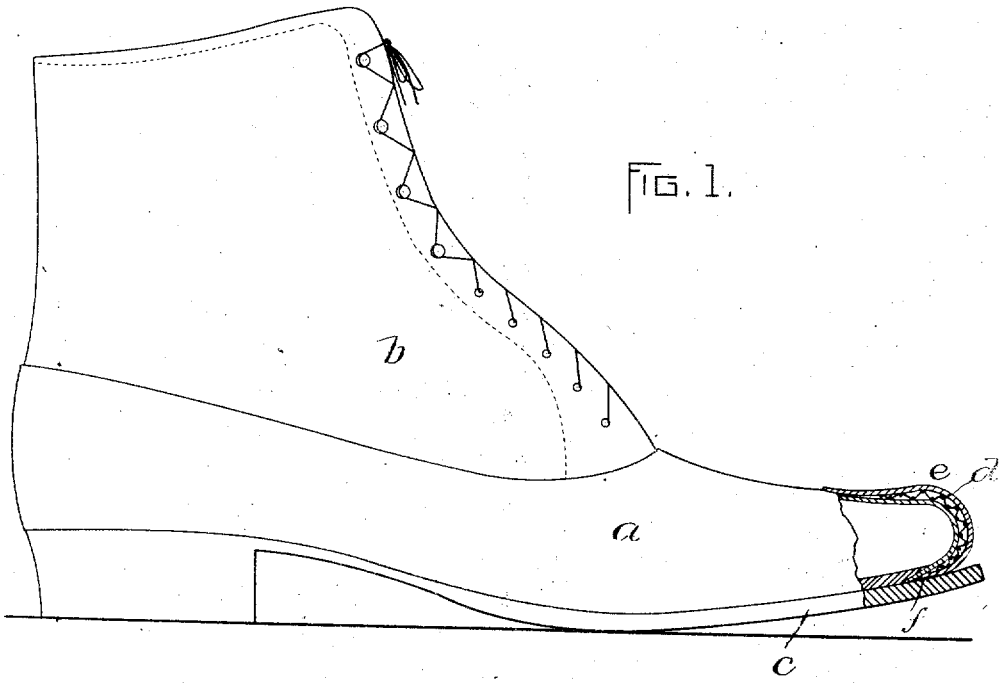
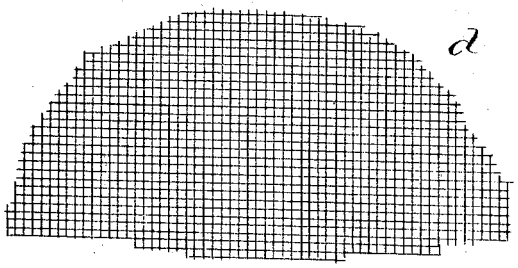
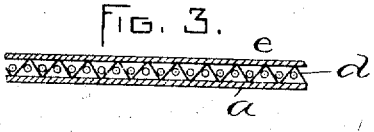
WITNESSES:
A. D. Harrison.
W. H. McLeod.
INVENTOR:
J. W. Packard.
by
Wright, Brown & Crosby,
Atty.

UNITED STATES PATENT OFFICE.

JAMES WALLACE PACKARD, OF BROCKTON, ASSIGNOR OF ONE-HALF TO BOUVÉ, CRAWFORD & COMPANY, OF BOSTON, MASSACHUSETTS.

SHOE.

SPECIFICATION forming part of Reissued Letters Patent No. 11,362, dated August 22, 1893.

Original No. 454,376, dated June 16, 1891. Application for reissue filed June 9, 1893. Serial No. 477,118.

*To all whom it may concern:*

Be it known that I, JAMES WALLACE PACKARD, of Brockton, in the county of Plymouth and State of Massachusetts, have invented certain new and useful Improvements in Shoes, of which the following is a specification.

Many varieties of boots and shoes contain leather toe-caps applied outside the toe of the upper, and to keep the toe of the boot or shoe in place what are known as "box-toes" are applied within the toe of the upper and between the upper and its usual lining. These box-toes are commonly composed of leather-board or of sole-leather; but they are objectionable, because to serve the desired purpose at all they must necessarily be quite thick and stiff, so much so as to make them very uncomfortable for the wearer of the boot or shoe containing them. Further, these box-toes are made by molding the leather-board or sole leather into shape under a heavy pressure, and when indented by a blow they fail to return to their original shape, and consequently when they lose their shape there is no way of restoring the shape of the toe of the boot or shoe containing them.

In my experiments to provide boots or shoes having leather toe-caps with an internal cap-support having the property of yielding to a blow and then of resuming its original shape, and at the same time not by its stiffness or thickness make a hard or objectionable ridge at the toe, I have taken the material known as "wire-cloth" and have interposed it between the usual toe-cap and the toe of the upper, thus leaving the interior of the boot or shoe at the toe smooth for contact against the toe of the wearer.

My invention consists in a boot or shoe having a wire-cloth cap-support interposed between the toe of the upper and the toe-cap, as will be described.

Figure 1 in side elevation represents a laced boot or Balmoral shoe embodying my invention, the toe being broken out to show the cap-support and cap. Fig. 2 shows the blank for a toe-cap support. Fig. 3 shows a sectional view of the toe-cap support having its interstices filled with pulp or other suitable elastic moldable material.

The vamp *a*, top *b*, and sole *c* are and may be of any suitable shape or material. The toe of the vamp has applied to it externally a toe-cap support *d*, and over it a toe-cap *e*, the said toe-cap and vamp when united to the sole by usual fastenings *f* inclosing between them the toe-cap support, the latter being shaped or crimped together with the toe of the upper and the toe-cap during the lasting of the boot or shoe.

A wire-cloth toe-cap support, when composed of steel or hard brass wire such as I prefer to use, possesses very considerable elasticity, so that if indented it will spring back into its original shape, or, if the blow is very hard and severe, is capable of being bent back into substantially its original shape.

The toe-cap support being thin and being placed wholly outside the vamp offers no objectionable obstruction to the toe of the wearer.

If heavy pressure is put upon the outside of the shoe in the process of treeing, the toe-cap will be indented to show the wire-cloth within it, and so for toes that are treed by heavy pressure I may cover the wire-cloth on one or both sides with paper-pulp or with a sheet of paper or like substance, as shown in Fig. 3, the paper preventing the wire from indenting the toe-cap sufficiently to show.

When the wire-cloth is bent or rounded over the last, the wires will converge over the toe, thus making a smooth strong toe-cap support inside the toe-cap.

I am aware that a shoe-tip has been composed of wire-cloth, as in United States Patent No. 27,433.

Having described my invention, I claim—

1. A cap support for boots and shoes consisting of woven or reticulated elastic strands having the property of yielding to a blow and then resuming their original shape, and adapted to be arranged beneath the toe-cap, as set forth.

2. A boot or shoe containing a vamp, a sole, and a toe-cap, combined with a toe-cap support composed of wire-cloth applied outside of the toe and interposed between the upper and toe-cap, substantially as described.

3. A boot or shoe containing a vamp, a sole, and a toe-cap, combined with a toe-cap support composed of wire-cloth applied outside of the toe and interposed between the upper and the toe-cap, the said wire-cloth having its interstices filled with paper or equivalent, substantially as described.

In testimony whereof I have signed my name to this specification, in the presence of two subscribing witnesses, this 6th day of May, A. D. 1893.

JAMES WALLACE PACKARD.

Witnesses:
FRED M. BIXBY,
JAMES BONNER.